(12) United States Patent
Jin et al.

(10) Patent No.: US 9,385,821 B2
(45) Date of Patent: Jul. 5, 2016

(54) SYSTEM AND METHOD FOR CALIBRATING BLUETOOTH LOW ENERGY SIGNAL STRENGTHS

(71) Applicant: Yahoo! Inc., Sunnyvale, CA (US)

(72) Inventors: Haojian Jin, Santa Clara, CA (US); Christian Holz, San Francisco, CA (US)

(73) Assignee: Excaliber IP, LLC, Sunnyvale, CA (US)

( * ) Notice: Subject to any disclaimer, the term of this patent is extended or adjusted under 35 U.S.C. 154(b) by 0 days.

(21) Appl. No.: 14/333,056

(22) Filed: Jul. 16, 2014

(65) Prior Publication Data

US 2016/0020861 A1    Jan. 21, 2016

(51) Int. Cl.

| | |
|---|---|
| *H04W 24/00* | (2009.01) |
| *H04B 17/11* | (2015.01) |
| *H04W 4/02* | (2009.01) |
| *H04W 4/00* | (2009.01) |
| *H04W 52/02* | (2009.01) |
| *G06Q 30/02* | (2012.01) |
| *G01S 11/14* | (2006.01) |
| *G01S 5/26* | (2006.01) |
| *G01V 1/38* | (2006.01) |
| *G01S 5/02* | (2010.01) |

(52) U.S. Cl.
CPC ............... *H04B 17/11* (2015.01); *G01S 11/14* (2013.01); *G06Q 30/0261* (2013.01); *H04W 4/008* (2013.01); *H04W 4/023* (2013.01); *H04W 52/0229* (2013.01); *G01S 5/0252* (2013.01); *G01S 5/26* (2013.01); *G01V 1/3835* (2013.01); *H04W 4/025* (2013.01)

(58) Field of Classification Search
CPC ........... H04M 1/72572; H04M 1/7253; G01V 1/3835; G01S 5/26; G01S 5/0027; G01S 5/30; G01S 17/42; G01S 5/0252; G01S 7/4808
USPC ............................ 455/41.2, 456.1–456.6, 457
See application file for complete search history.

(56) References Cited

U.S. PATENT DOCUMENTS

| | | | |
|---|---|---|---|
| 8,145,255 B2 | 3/2012 | Rekimoto | |
| 8,867,313 B1 * | 10/2014 | Rivlin | G01S 11/14 367/118 |
| 2004/0162084 A1 * | 8/2004 | Wang | G01S 5/14 455/456.1 |
| 2008/0304361 A1 | 12/2008 | Peng et al. | |
| 2009/0233551 A1 | 9/2009 | Haartsen et al. | |
| 2013/0260693 A1 | 10/2013 | Un et al. | |
| 2014/0030982 A1 * | 1/2014 | Cardona | G01S 5/14 455/67.11 |
| 2014/0113558 A1 | 4/2014 | Varoglu et al. | |
| 2015/0282088 A1 * | 10/2015 | Weizman | H04W 52/0245 455/41.2 |

OTHER PUBLICATIONS

Written Opinion of the International Searching Authority (PCT/US2015/040384) dated Oct. 19, 2015.

* cited by examiner

*Primary Examiner* — Olumide T Ajibade Akonai
(74) *Attorney, Agent, or Firm* — James J. DeCarlo; Greenberg Traurig LLP

(57) ABSTRACT

Disclosed is a system and method for calibrating BLE signal strengths to high-accuracy/precise distances. The present disclosure involves auto-calibrating BLE-based tracking systems, such as, for example, those used indoors using acoustic signals. The present disclosure enables BLE-based distance estimation to be accurate to decimeters and centimeters. The disclosed systems and methods utilize signals communicated to and from roaming devices in order to determine the distance(s) between the roaming device and installed BLE units. A signal-strength to distance map can then be constructed for reuse on any device with a Bluetooth component.

11 Claims, 9 Drawing Sheets

SYSTEM AND METHOD FOR CALIBRATING BLUETOOTH LOW ENERGY SIGNAL STRENGTHS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to tracking mobile devices, and more particularly towards systems and methods for calibrating Bluetooth Low Energy signal strengths.

BACKGROUND

Bluetooth low energy (BLE) technology is quickly becoming the de facto standard for robust indoor tracking. For example, BLE is increasingly being used in commercial situations to augment shopping trips in malls and airports by offering relevant suggestions or coupons, or to support experiences in stadiums during sports events. In order to track devices based on BLE, conventional tracking systems interpolate the signal strengths observed for each BLE unit, essentially using signal strength as a distance cue. This, however, substantially limits the accuracy with which they track indoor locations. That is, conventional signal strength indicator-based systems and methods are not capable of accurately ranging communicated information without calibration.

SUMMARY

The present disclosure describes systems and methods for calibrating BLE signal strengths to high-accuracy/precise distances. The present disclosure involves auto-calibrating BLE-based tracking systems, such as, for example, those used increasingly in in-door situations using acoustic signals. The present disclosure enables BLE-based distance estimation to be accurate to decimeters and centimeters, whereas estimates produced by existing systems exhibit an error of several meters—for example, between 2-5 meters. According to some embodiments, the disclosed systems and methods utilize signals communicated to and from devices in order to determine the distance(s) between the device and installed BLE units. A signal-strength to distance map can then be constructed for reuse on any device with a Bluetooth™ component.

In accordance with one or more embodiments, a method is disclosed which includes connecting, via a computing device, to a first Bluetooth Low Energy (BLE) unit at a location, said connection comprising identifying a beacon emitted from said first BLE unit and an identifier of the first BLE unit; determining, via the computing device, a signal strength associated with the first BLE unit from said beacon; emitting, via the computing device, a first signal, said first signal having a first timestamp associated with said emission and a second timestamp associated with reception by said first BLE unit; receiving, at the computing device, second signal emitted from the first BLE unit, said second signal having a third timestamp associated with the emission from the first BLE unit and a fourth timestamp associated with said reception of the second signal; determining, via the computing device, a distance between the computing device and the first BLE unit, said distance based upon an aggregated distance based on the first, second, third and fourth timestamps; and storing, via the computing device, said distance in a storage, said distance stored in association with said signal strength and the identifier of the first BLE unit.

In accordance with some embodiments, a method is disclosed which includes connecting, via a computing device, to a first Bluetooth Low Energy (BLE) unit at a location, said connection comprising identifying an identifier of the first BLE unit; transmitting, via the computing device, a command for said first BLE unit to emit a signal, said signal being an acoustic signal, said command associated with a first timestamp; receiving, at the computing device, said signal from the first BLE unit, said reception associated with a second timestamp; determining, via the computing device, a time delay between said first timestamp and said second timestamp; determining, via the computing device, a distance between the computing device and the first BLE unit, said distance determination comprising multiplying said time delay by the speed of sound in a current temperature at said location; and storing, via the computing device, said distance in a storage, said distance stored in association with the identifier of the first BLE unit.

In accordance with some embodiments, a method is disclosed which includes connecting, via a computing device, to a first Bluetooth Low Energy (BLE) unit at a location, said connection comprising identifying an identifier of the first BLE unit, wherein said BLE unit records and processes transmitted audio signals; transmitting, via the computing device, a first audio signal, said first audio signal associated with a first timestamp; receiving, via the computing device, a response from said first BLE unit, said response associated with a second timestamp corresponding to said reception by the computing device, wherein said response is based upon the first BLE unit receiving the first audio signal and communicating said response back to said computing device; determining, via the computing device, a time delay between the first timestamp and the second timestamp; determining, via the computing device, a distance between the computing device and the first BLE unit, said distance determination comprising multiplying said time delay by the speed of sound in a current temperature at said location; and storing, via the computing device, said distance in a storage, said distance stored in association with the identifier of the first BLE unit.

In accordance with some embodiments, a method is disclosed which includes connecting, via a computing device, to a first Bluetooth Low Energy (BLE) unit at a location, said connection comprising identifying a beacon emitted from said first BLE unit and an identifier of the first BLE unit; determining, via the computing device, an observed signal strength associated with the first BLE unit from said beacon; searching, via the computing device, a storage associated with said location based on the observed signal strength and the identifier of the first BLE unit, said storage storing, for each BLE unit at said location, a BLE identifier, signal strength and a measured distance; determining, via the computing device, a distance between the computing device and the first BLE unit, said distance corresponding to a measured distance for the first BLE unit in said storage; and receiving, at the computing device, said distance.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for calibrating BLE signal strengths.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
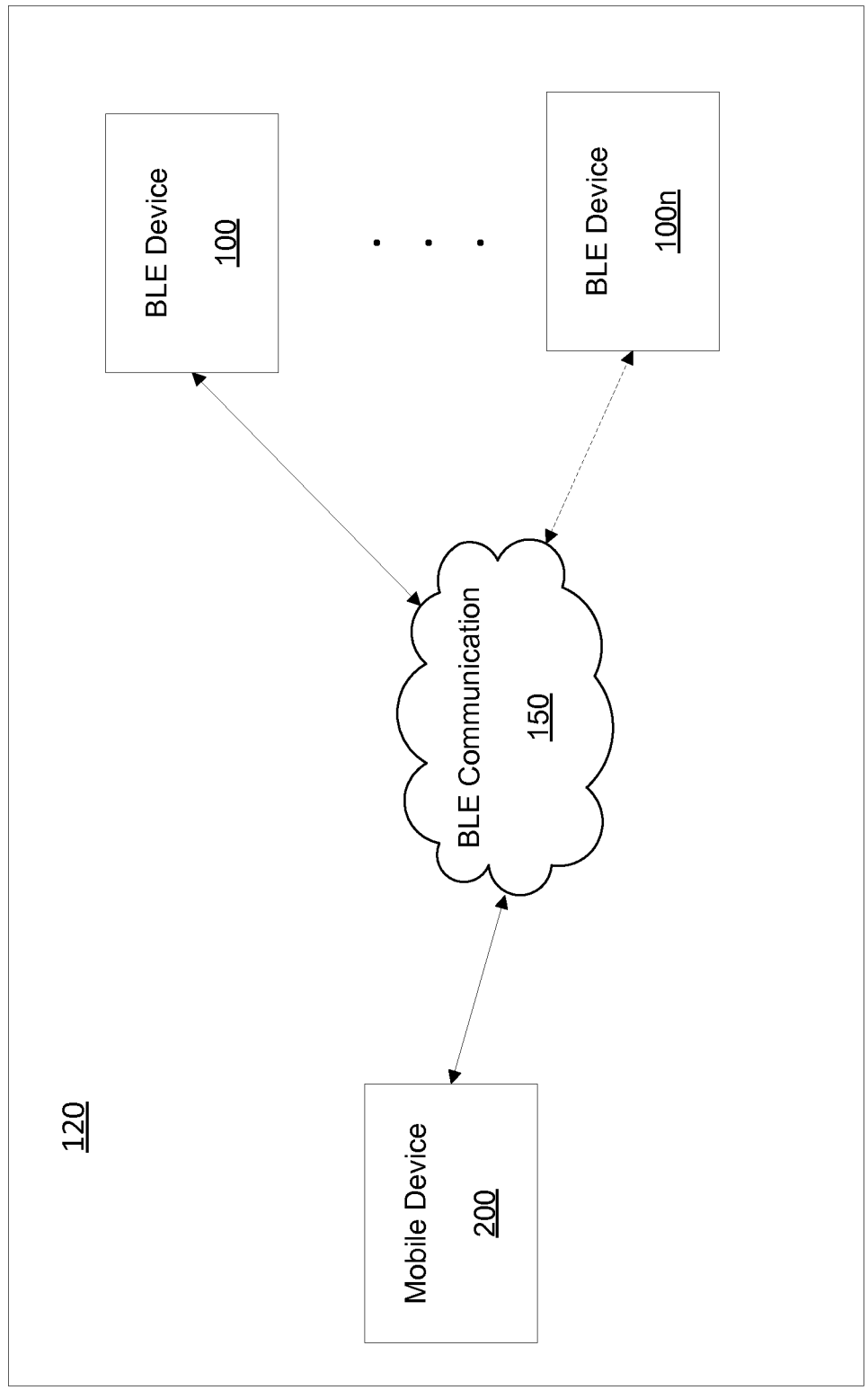
FIG. 1 is a schematic diagram illustrating an example of BLE communication system according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, Bluetooth Low Energy Technology (BLE) as a function of the Bluetooth Core Specification Version 4.0 of Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, Bluetooth™ technology enables short-range wireless communication, rather than having to use cables to connect devices to each other. That is, for example, when Bluetooth wireless technology is implemented in a cellular phone or a laptop computer, the cellular phone or the laptop computer may be connected to a wireless communication network without having to make a cable connection. All types of digital devices, including smartphones, printers, Personal Digital Assistants (PDAs), desktop computers, mobile devices and terminals, wearable devices, fax machines, keyboards, and joysticks and the like, can be a part of a Bluetooth system. Bluetooth wireless technology can also be used to form an interface between an existing data network and peripheral devices and form a special group between devices which are located far from a fixed network infrastructure. Bluetooth technology provides a robust wireless connection based on quick recognition and by using a frequency hopping method. A Bluetooth module avoids interference with other signals by hopping to a new frequency after the transmission or reception of a packet. Compared to other systems which operate within the same frequency range, the Bluetooth technology uses an especially short and fast packet Bluetooth Low Energy (BLE) is a function of the Bluetooth Core Specification Version 4.0 of Bluetooth, which is a short-range wireless communication technology. BLE (also referred to as Bluetooth LE, and marketed as Bluetooth Smart), is a wireless personal area network technology aimed at novel applications in the healthcare, fitness, security, and home entertainment industries, in addition to smart home and proximity detection services. BLE provides considerably reduced power consumption and cost compared to classic Bluetooth, while maintaining a similar communication range. BLE is natively supported by mobile operating systems, including, for example, iOS, Android, Windows Phone and BlackBerry, as well as OS X, Linux, and Windows 8. BLE involves advantages including, but not limited to, low power requirements, operating for "months or years" on a button cell (i.e., a small single cell battery). As discussed herein, BLE has compatibility with a large installed base of mobile phones, tablets and computers.

Additionally, BLE supports "electronic leash" applications, which are well suited for long battery life, "always-on" devices. As understood by those of skill in the art, an electronic leash is the pairing ("leashing") of one or more wireless devices to a host device that allows the user to find misplaced or out-of-sight objects by activating the host device such that the "leashed" object identifies itself. Thus, BLE, via electronic leashing, can allow a single user-operated device to send communications to a large number of devices or objects.

Thus, based on the above foundational discussion, in addition to the detailed discussion below, the present disclosure describes systems and methods for calibrating BLE signal strengths to high-accuracy/precise distances. The present disclosure involves auto-calibrating BLE-based tracking systems, such as, for example, those used increasingly in in-door situations using acoustic signals. The present disclosure enables BLE-based distance estimation to be accurate to decimeters and centimeters, whereas estimates produced by existing systems exhibit an error of several meters—for example, between 2-5 meters. Conventional systems simply categorize distances according to four (4) categories: 1) close, 2) medium far, 3) far away, and 4) no signal; which are absent the ability to accurately and precisely determine distances to decimeters and centimeters.

According to some embodiments, the disclosed systems and methods utilize signals communicated to and from devices in order to determine the distance(s) between the device and installed BLE units at a location. A signal-strength to distance map can then be constructed for reuse on any device with a Bluetooth™ component.

By way of a non-limiting example, according to some embodiments of the present disclosure, a location such a mall can have a plurality of BLE devices (also referred to as BLE units) installed and located at various locations within the main location. For example, if the mall has stores Macys, Footlocker and a food court, the mall can have 3 BLE devices/units situated in the mall respective to the stores. Therefore, a determination of the user's location and/or distance to and from each store can be realized through the disclosed systems and methods. Thus, according to some embodiments, relevant advertisements, coupons, or other types of information can be effectively communicated to the user based on the user's determined location. That is, a user's distance to a particular BLE device can be determined, and as a result, relevant information can be provided to the user based on a determined distance to a BLE unit.

The present disclosure will now be described more fully with reference to the accompanying drawings, in which various embodiments of the disclosure are shown. The disclosure may, however, be embodied in many different forms and should not be construed as being limited to the embodiments set forth herein.

FIG. 1 is a diagram illustrating a BLE communication system according to some embodiments of the present disclosure. Not all the components may be required to practice the disclosure, and variations in the arrangement and type of the components may be made without departing from the spirit or scope of the disclosure. The BLE communication system, according to some embodiments of the present disclosure, may include a mobile device 200 and a BLE device 100. The mobile device 200 may be a terminal for providing a user with a service via BLE communication with the external BLE device 100. For example, the mobile device 200 may register and manage information about the external BLE device 100, for example, Identification (ID) information, in a memory.

As discussed in more detail below with respect to FIGS. 3-8, multiple BLE devices/units 100-100$n$ can be intermittently located around a location 120, thereby, according to Processes 400-700 (and 800), as discussed below, a user's device 200 can communicates with each BLE unit as the user traverses a location 120. For example, BLE devices 100-100$n$ can be located around a shopping mall (i.e., location 120), where each BLE device is associated with a particular restaurant or position within the location, and the user's device (e.g., mobile device) communicates via a BLE connection (e.g., BLE communication 150) with each BLE device according to embodiments of the present disclosure.

The mobile device 200, according to some embodiments, may be implemented in various forms. For example, the mobile device 200 may include virtually any portable computing device capable of connecting to another device and receiving information. Such devices include multi-touch and portable devices such as, but not limited to, cellular phones, smart phones, display pagers, radio frequency (RF) devices, infrared (IR) devices, Personal Digital Assistants (PDAs), handheld computers, laptop computers, wearable computers, tablet computers, navigation devices, e-book terminals, integrated devices combining one or more of the preceding devices, and the like. Mobile devices 100 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 100 may uniquely identify themselves through any of a variety of mechanisms, including a phone number, Mobile Identification Number (MIN), an electronic serial number (ESN), or other mobile device identifier.

The BLE device 100 may communicate identification information via BLE communication 150. As understood by those of skill in the art, BLE communication 150 can be coupled to, or implemented via a wireless network. A Wireless network may include any of a variety of wireless sub-networks that may further overlay stand-alone ad-hoc networks, and the like, to provide an infrastructure-oriented connection for mobile device 200 and BLE device 100. Such sub-networks may include mesh networks, Wireless LAN (WLAN) networks, cellular networks, and the like. Wireless network connectivity for BLE communication 150 may further include an autonomous system of terminals, gateways, routers, and the like connected by wireless radio links, and the like. These connectors may be configured to move freely and randomly and organize themselves arbitrarily, such that the topology of the wireless network may change rapidly. BLE communication 150 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile device 200 with various degrees of mobility. For example, a wireless network BLE communication 150 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, BLE communication 150 may include virtually any wireless communication mechanism by which information may travel between mobile device 200, BLE device 100, and another computing device, network, and the like.

BLE communication 150, as a network, is enabled to employ any form of computer readable media for communicating information from one electronic device to another. For security of the information, such information may be secured by using a known or to be known negotiated encryption key or a pre-defined encryption key. Such encryption may occur at the mobile device 200 and/or at the BLE device 100, or some combination thereof. Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the BLE device 100 may broadcast the identification information in a format of an advertising packet, as discussed in more detail below with respect to FIG. 8. Such communication, or broadcast, can be implemented via BLE communication 150 coupling with an ad server that comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through or at a location(s), and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

According to some embodiments, the BLE device 100 may be implemented in various forms. For example, the BLE device 100 described in the present disclosure may be implemented, via a BLE Device Monitor, in a format of a simple BLE tag, mobile equipment, such as, but not limited to, a BLE phone or a BLE tablet PC, or an accessory, such as, but not limited to, a BLE wristwatch.

Figure 2:
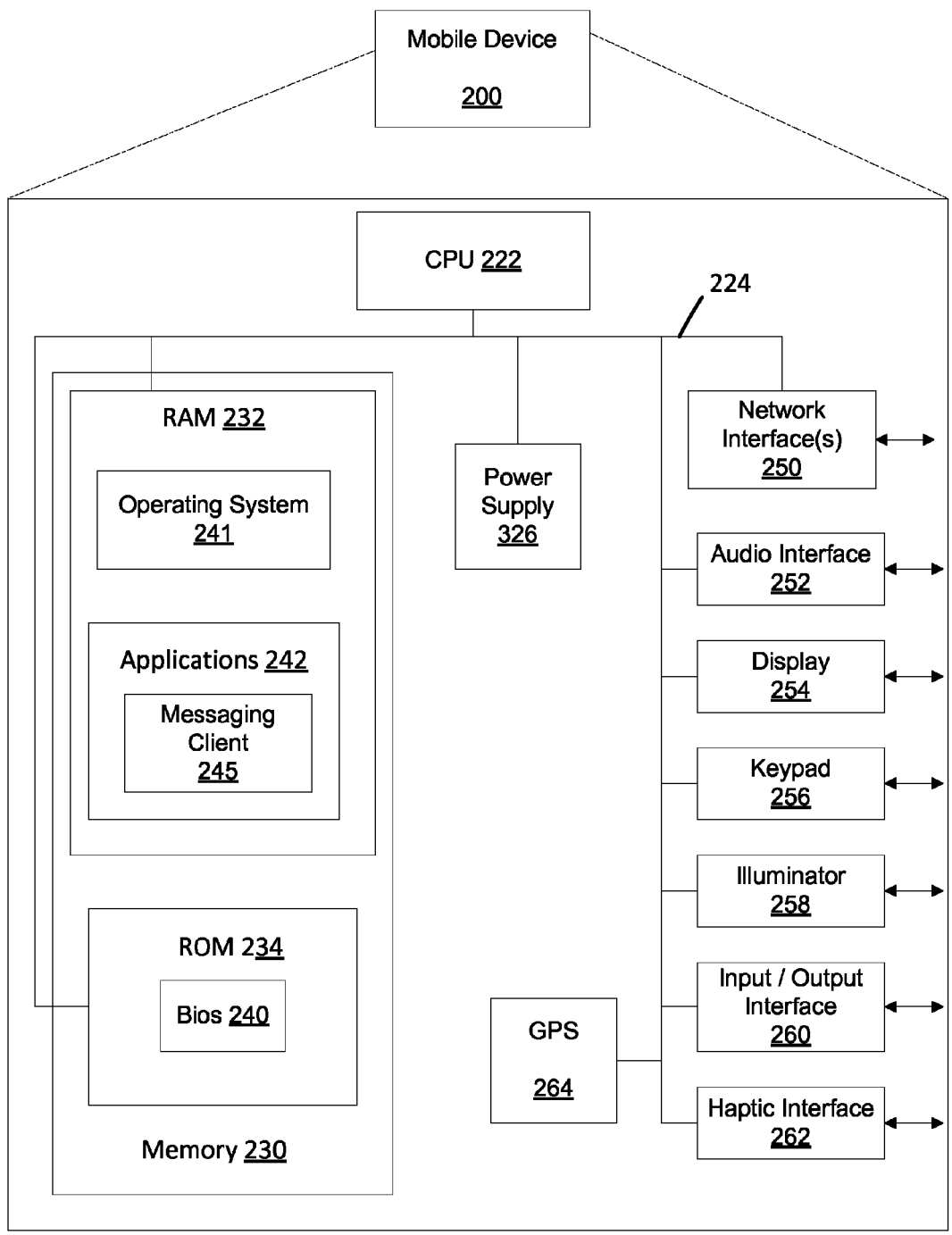
FIG. 2 depicts is a schematic diagram illustrating a client device in accordance with some embodiments of the present disclosure.

FIG. 2 is a schematic diagram illustrating an example embodiment of a client device that may be used within the present disclosure. As discussed above, a client device can be any type of mobile or portable device. For purposes of this disclosure, and for clarity of the following discussion, such devices will be referred to as "roaming devices"—respective to the use of such devices within the scope of the present disclosure upon a user traversing a location. It should be understood that a roaming device refers to all types of portable devices that support BLE, as discussed above. Roaming device 200 may include many more or less components than those shown in FIG. 2. However, the components shown are sufficient to disclose an illustrative embodiment for implementing the present disclosure. Thus, roaming device 200 may represent, for example, mobile devices discussed above in relation to FIG. 1.

As shown in FIG. 2, roaming device 200 includes a processing unit (CPU) 222 in communication with a mass memory 230 via a bus 224. Roaming device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Roaming device 200. A rechargeable or non-rechargeable battery may be used to provide power. The power may also be provided by an external power source, such as an AC adapter or a powered docking cradle that supplements and/or recharges a battery.

Roaming device 200 may optionally communicate with a base station (not shown), or directly with another computing device. Network interface 250 includes circuitry for coupling Roaming device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgment for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the roaming device is powered. Also, illuminator 258 may backlight these buttons in various patterns when particular actions are performed, such as dialing another roaming device. Illuminator 258 may also cause light sources positioned within a transparent or translucent case of the roaming device to illuminate in response to actions.

Roaming device 200 also comprises input/output interface 260 for communicating with external devices, such as a BLE device/unit 100 (from FIG. 1) or a headset, or other input or output devices not shown in FIG. 2. Input/output interface 260 can utilize one or more communication technologies, such as USB, infrared, Bluetooth™, BLE, or the like. Interface 260 may include one or more units for communication between the roaming device 200 and the BLE device 100, or between the roaming device 200 and a server. For example, Interface 260 may include a BLE communication unit, a mobile communication unit, and a broadcasting receiving unit. The BLE communication unit supports a BLE communication function. The BLE communication unit may scan the BLE device 100 for a predetermined period of time or upon a request from a user. The BLE communication unit may involve a sensor hub. As understood by those of skill in the art, the sensor hub is a type of Micro Controller Unit (MCU) and may be connected to various types of sensors. The sensor hub, according to some embodiments can collect information about the external BLE device 100.

The communication unit of interface 260 may also support other short-range wireless communication functions, in addition to the BLE communication function. Short-range wireless technology may include, but is not limited to, a wireless Local Area Network (LAN) which could be a Wi-Fi, Bluetooth, WiFi direct (WFD), Near Field Communication (NFC), Ultra WideBand (UWB), or Infrared Data Association (IrDA) network, as discussed above with respect to BLE communication 150. The mobile communication unit of interface 260 transmits and receives a wireless signal to and from with at least one of a base station, an external terminal, and a server on a mobile communication network. The wireless signals may include, for example, a voice call signal, a video phone call signal or various forms of data used to transmit and receive text or multimedia messages. The broadcasting receiving unit of interface 260 receives broadcasting signals and/or broadcasting-related information from outside, via a broadcasting channel. The broadcasting channel may include, but is not limited to, a satellite channel and a terrestrial broadcast channel.

Haptic interface 262 is arranged to provide tactile feedback to a user of the roaming device. For example, the haptic interface may be employed to vibrate roaming device 200 in a particular way when the Roaming device 200 receives a communication from another user.

Optional GPS transceiver 264 can determine the physical coordinates of Roaming device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Roaming device 200 on the surface of the Earth. It is understood that under different conditions, GPS transceiver 264 can determine a physical location within millimeters for Roaming device 200; and in other cases, the determined physical location may be less precise, such as within a meter or significantly greater distances. In one embodiment, however, Roaming device 200 may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Roaming device 200. The mass memory also stores an operating system 241 for controlling the operation of Roaming device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Roaming device 200 to store, among other things, applications 242 and/or other data. For example, data stores may be employed to store information that describes various capabilities of Roaming device 200. The information may then be provided to another device based on any of a variety of events, including being sent as part of a header during a communication, sent upon request, or the like. At least a portion of the capability information may also be stored on a disk drive or other storage medium (not shown) within Roaming device 300.

Applications 242 may include computer executable instructions which, when executed by Roaming device 200, transmit, receive, and/or otherwise process audio, video, images, and enable telecommunication with another user of another roaming device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described with respect to FIGS. 3-8.

Figure 3:
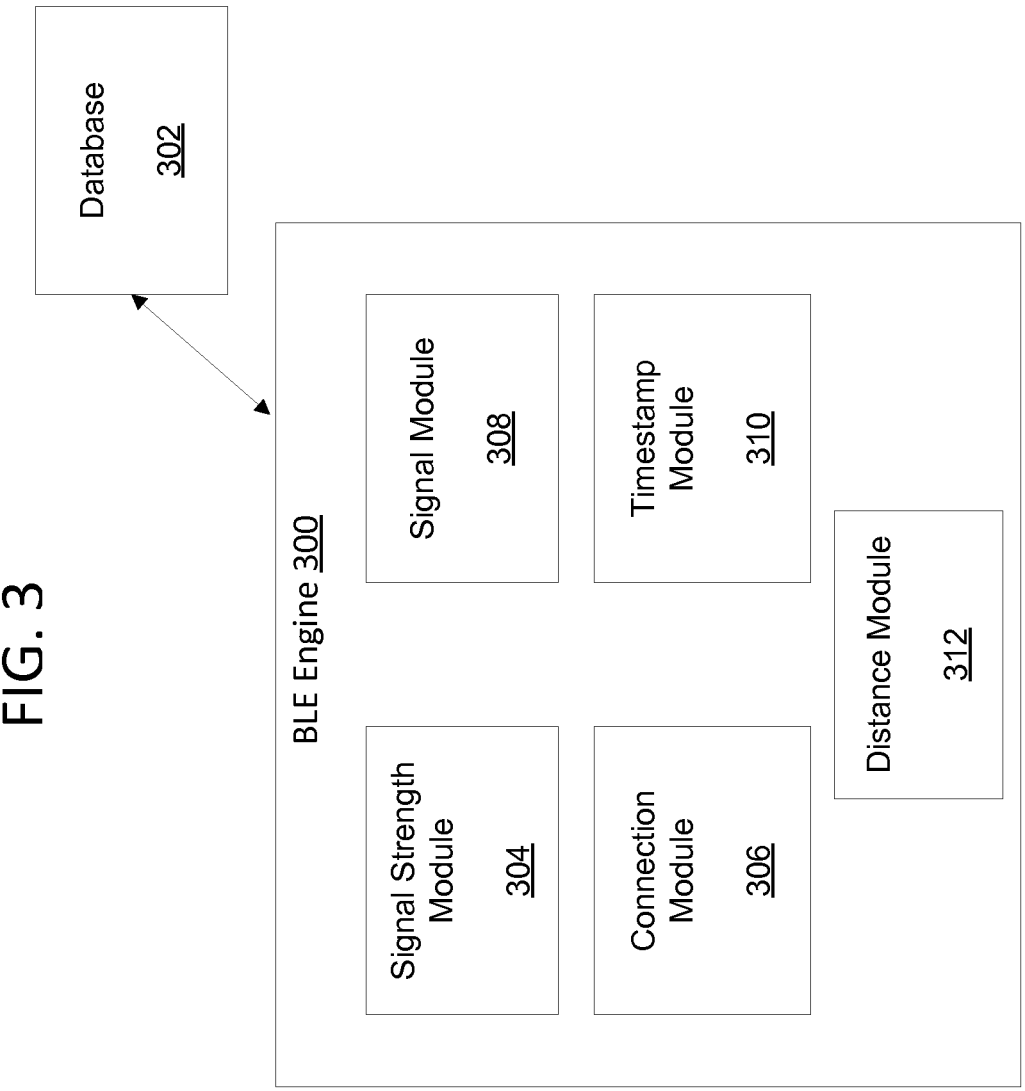
FIG. 3 is a schematic block diagram illustrating components of a system in accordance with embodiments of the present disclosure.

FIG. 3 is a block diagram illustrating the components for performing the systems and methods discussed herein. FIG. 3 includes a BLE engine 300 and an associated database 302 for storing BLE information. The BLE engine 300 could be hosted by a roaming device, BLE device, a server, content provider, an ad server, and the like, or any combination thereof. As discussed in more detail below, the BLE information can be provided to the BLE engine 300 or accessed by a computer program or device that can access the information. Such information, as discussed in more detail below, relates to determined distances associated between roaming devices and BLE devices (or units), a BLE unit's signal strength and the BLE unit's identifier. Indeed, the BLE information can include a type of roaming device, a user associated with the device, proximity data or location data associated with the roaming device and/or BLE device, number of BLE devices within a proximity or associated with a location, among other types of information. In some embodiments, the BLE information can be stored in a lookup table (a data structure in a storage) in database 302, which is associated with a location, coordinates, or, for example, a commercial entity. The database 302 can be any type of database or memory that can store the information mentioned above. The database 302 can be associated with a location, a device (either roaming and/or BLE device) or a network. That is, for example, BLE information associated with a particular location, for example, a mall or stadium, can be stored in a database 302 that is dedicated to such location, as will be evident from the below discussion.

The BLE engine 300 includes a signal strength module 304, a connection module 306, a signal module 308, a timestamp module 310 and a distance module 312. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIGS. 4-7, whereby the components of FIG. 3 are implemented to perform the steps and processes of processes 400-700.

Figure 4:
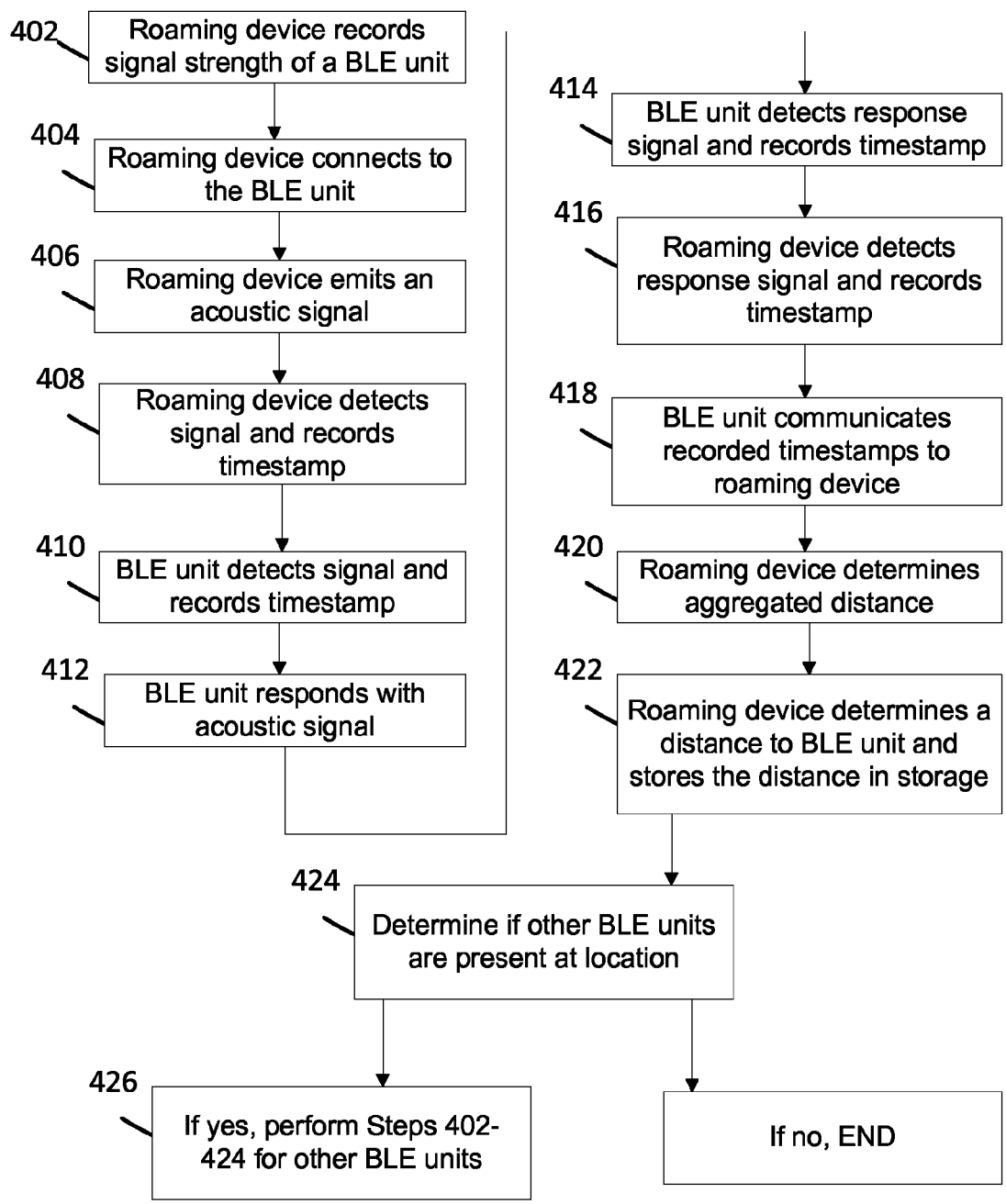
FIG. 4 is a flowchart illustrating steps performed in accordance with some embodiments of the present disclosure.
Figure 5:
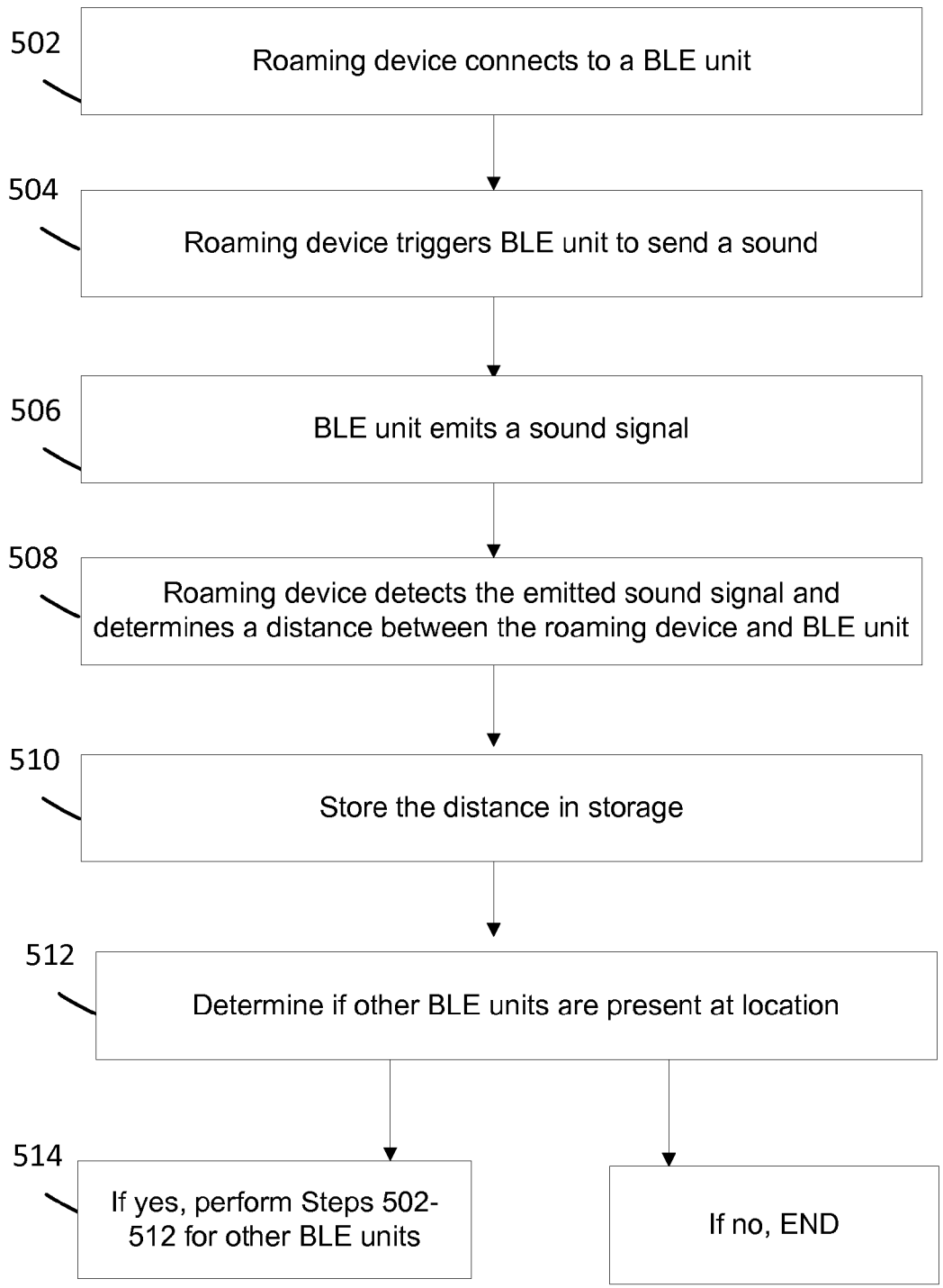
FIG. 5 is a flowchart illustrating steps performed in accordance with some embodiments of the present disclosure.
Figure 6:
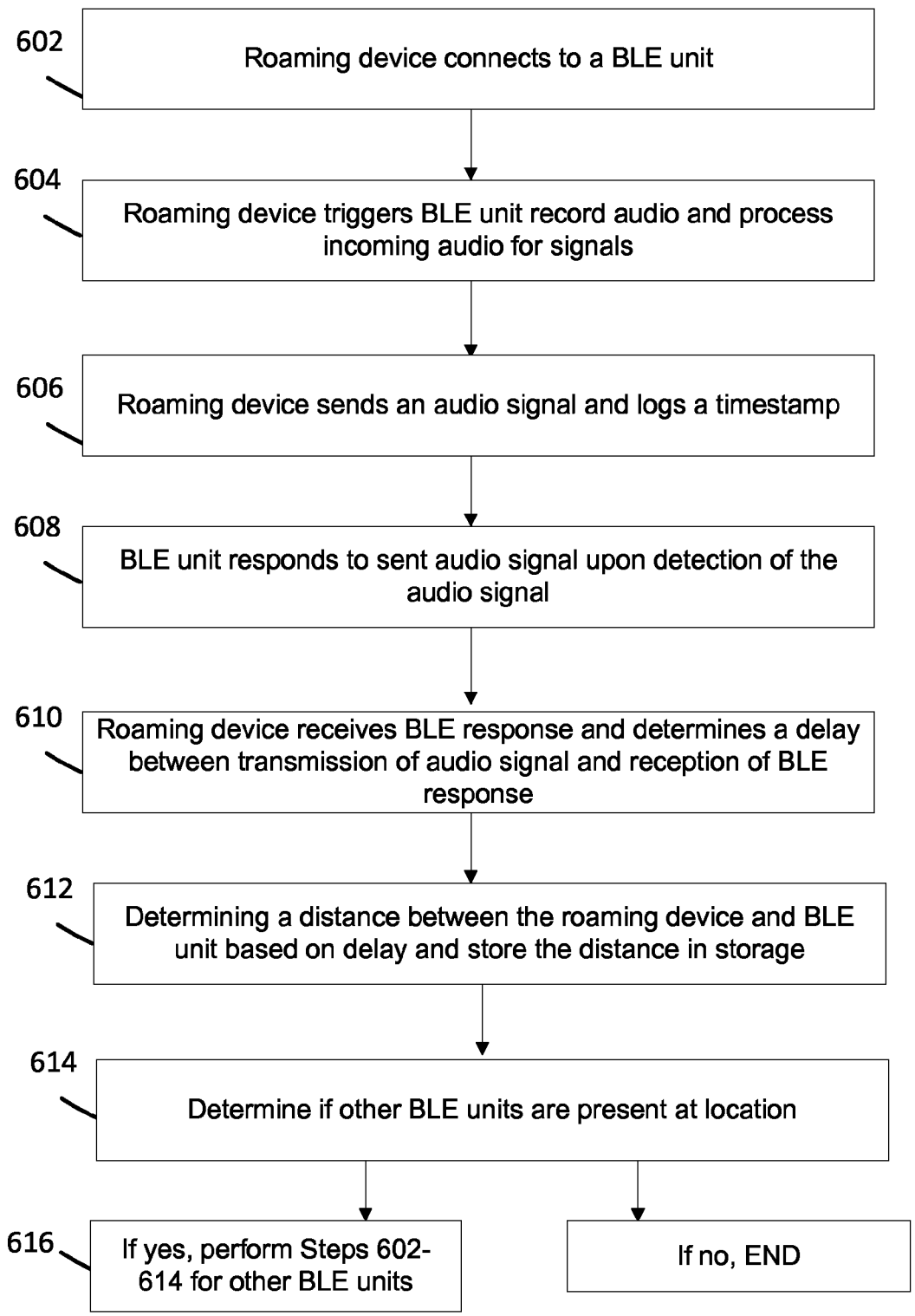
FIG. 6 is a flowchart illustrating steps performed in accordance with some embodiments of the present disclosure.
Figure 7:
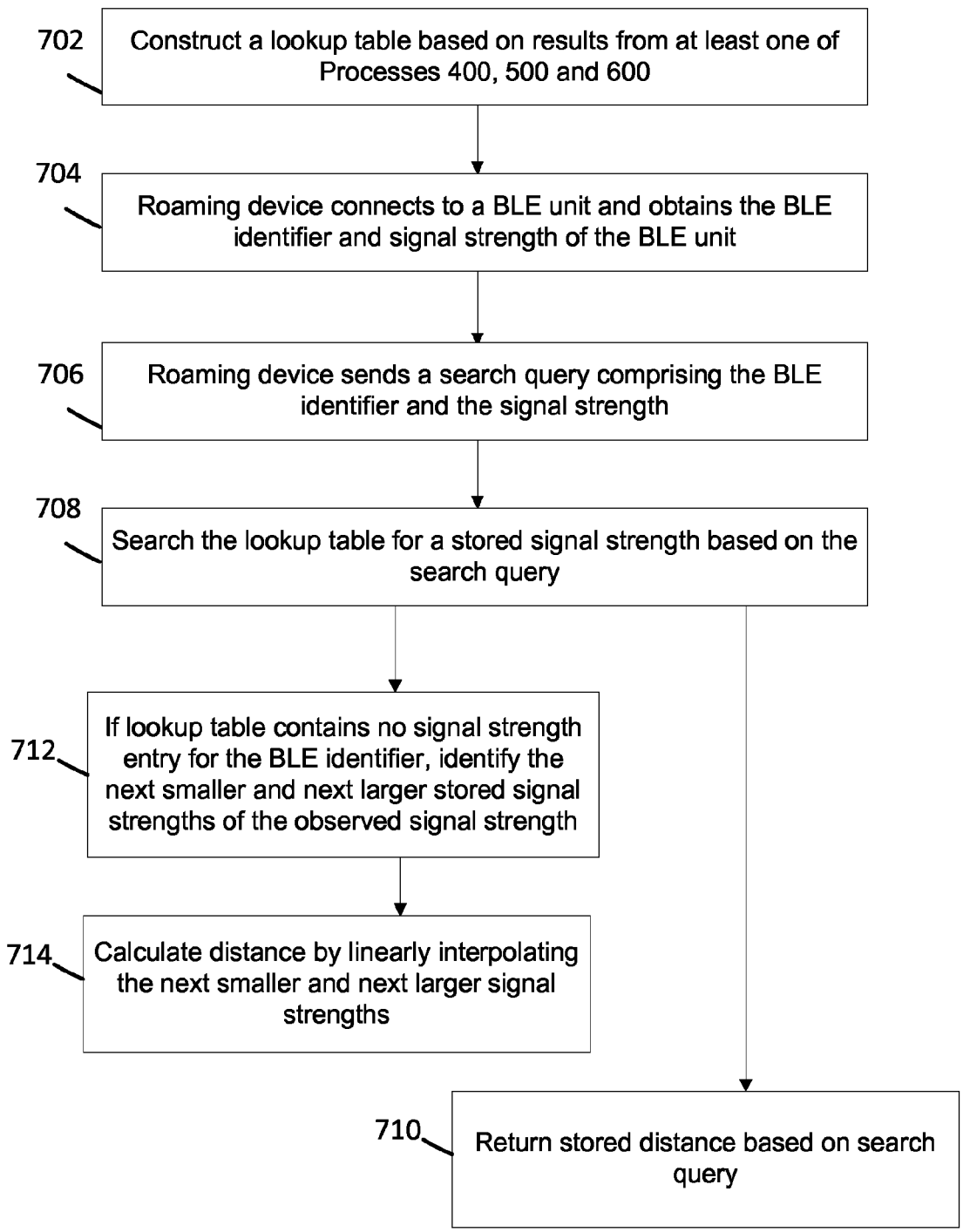
FIG. 7 is a flowchart illustrating steps performed in accordance with some embodiments of the present disclosure.

The present disclosure involves four (4) solutions for calibrating BLE signal strengths to precise distances. All solutions involve a roaming device (the mobile device as discussed above) that incorporates at least one of a microphone, speaker and BLE. FIG. 4 is a process 400 illustrating steps performed in accordance with embodiments of the devices having a microphone, speaker and BLE capabilities. FIG. 5 is a process 500 illustrating steps performed in accordance with embodiments of the devices having a speaker and BLE capabilities. FIG. 6 is a process 600 illustrating steps performed in accordance with embodiments of the devices having a microphone and BLE capabilities. FIG. 7 is a process 700 illustrating steps performed in accordance with embodiments of the devices having only BLE capabilities.

Thus, as shown in FIGS. 4-7, the present disclosure reduces signal strength error to decimeters and centimeters in embodiments of the disclosed BLE-based tracking accuracy systems and methods where all or at least one of a microphone, speaker and BLE capabilities are present. With respect to FIGS. 4-7, as discussed above and understood by those of skill in the art, BLE devices/units can be intermittently located around a location, thereby, according to Processes 400-700 (and 800), as discussed below, a user's roaming device communicates with each BLE unit as the user traverses a location.

Turning to FIG. 4, a process 400 is shown illustrating steps performed in accordance with embodiments of the present disclosure where the devices have a microphone, speaker and BLE. In Step 402, a user roaming device records the signal strength of a BLE unit. That is, the beacons transmitted from the BLE unit are recorded and the strength of such signal is determined from such recording. This is performed by the signal strength module 304. According to some embodiments, the signal strength is determined by performing multiple readings, at least one reading per emitted beacon, and determining the mean of the readings as the recorded signal strength. It should be understood that all known and to be known signal strength reading techniques and algorithms, as well as all known and to be known localization techniques and algorithms using received signal strengths (RSS based localization algorithms and techniques) can be utilized for performing Step 402. In Step 404, the roaming device connects to the BLE unit. This is performed by the connection module 306. As discussed herein with respect to Step 404, and in the below processes of FIGS. 5-7, connecting to the BLE unit involves the roaming device pinging, broadcasting or receiving broadcasts from the BLE unit, directly transmitting to a specific BLE unit, and the like. According to some embodiments, such connections can occur automatically, manually responsive user input, or periodically according to a system set, Bluetooth responsive or user dedicated time period.

After connecting, the roaming device emits an acoustic signal, such as a chirp which may comprise a single frequency, a changing frequency or combination of frequencies (e.g., a DTMF [dual-tone multi-frequency] chirp), and exist in a range below, within or above the range of human hearing. Step 406. In Step 408, the roaming device detects its own acoustic signal and records its local timestamp (referred to as T1). In Step 410, the BLE unit detects the acoustic signal emitted from the roaming device and records its local timestamp at the BLE unit (referred to as T2). In response to Step 410, the BLE unit then plays back an acoustic signal, such as a chirp. Step 412. The BLE unit also detects its own emitted acoustic signal and records its local timestamp (T3). Step 414. In response to the BLE unit's signal emission, the roaming device detects the acoustic signal and records its local timestamp (T4). Step 416. The signal communications of Steps 406-416 are performed by the signal module 308, and the timestamp recordings are performed by the timestamp module 310.

In Step 418, the BLE unit communicates both recorded local timestamps T2 and T3 to the roaming device using Bluetooth™. In response, the roaming device calculates the aggregated distance based on timestamps T1, T2, T3, T4. Step 420. That is, the roaming device calculates the distance between the roaming device's speaker to the BLE unit's microphone, in addition to the distance between the BLE unit's speaker to the roaming device's microphone, from the four timestamps T1, T2, T3, T4. For example, the delay between T1 and T2, and the delay between T3 and T4 are aggregated. According to some embodiments, Step 420 involves determining current conditions at the location, such as but not limited to the current temperature; therefore, a delay time based on T1, T2, T3, T4 can then be multiplied by the speed of sound c in the current conditions. For example, $c=(331.3+0.606*v)$ m/s; v=current temperature. It should be understood that known or to be known acoustic signal detection algorithms can be implemented in the disclosed systems and methods for using sound detection to determine a distance or range or position.

In Step 422, the roaming device divides the aggregated distance from Step 420 by two (2) and stores the result in a lookup table in association with the BLE unit's identifier and signal strength. Steps 420 and 422 are performed by the distance module 312. That is, for the signal strength identified by the roaming device in Step 420, a determined distance to a BLE unit and the BLE's identifier are stored in a lookup table in association with one other. As discussed above, the BLE information includes determined distance, BLE unit identifier and signal strength, which is stored in the lookup table respective to database 302. Therefore, upon searching for a BLE unit's ID, a subsequent device can identify the associated distance with particular signal strength. This provides information relating to the signal strength to distance for a roaming device to a particular BLE unit. According to some embodiments, the storing occurring in Step 422 can also include storing the GPS location of the BLE unit (and/or roaming device) and a time/date of the result in association with the identifier of the BLE unit. Accordingly, recalibration may be required if the BLE unit is moved as the environment of and surrounding the BLE unit can have a strong influence on the signal strength. In Step 424, it is determined if other BLE units are present in or at the location, and if so, the above steps are repeated for the remaining units at the location to determine distances. That is, the roaming device moves through the room, or traverses the location, and repeats this process for varying distances to all BLE units. Step 426. Process 400 results in an accuracy approaching 1-5 centimeters of error for a determined distance or location of a roaming device to a BLE unit.

Turning to FIG. 5, a process 500 is shown illustrating steps performed in accordance with embodiments of the present disclosure where the devices have a speaker and BLE. In Step 502, the roaming device connects to a BLE unit using Bluetooth (via connection module 306). The roaming device then triggers the BLE unit to send (e.g., broadcast) a sound. Step 504. That is, for example, the roaming device communicates a command to the BLE unit for the BLE unit to respond by broadcasting an acoustic sound, such as a chirp. In response to Step 504, the BLE unit emits the sound signal. Step 506. Steps 504-506 are performed by the signal module 308. In Step 508, the roaming device detects the signal and multiplies the delay time between requesting the signal (T1) to receiving the signal (T2) by the speed of sound in the current conditions, where the speed of sound equals: $c=(331.3+0.606*v)$ m/s, v=current temperature. That is, the roaming device determines a time delay—a difference between (T1) requesting the BLE unit to broadcast an acoustic signal and (T2) when the roaming device detects the BLE unit communicated signal. This time delay is then multiplied according to a signal detection algorithm, for example, according to some embodiments: the speed of sound in the current conditions (e.g., speed of sound at the current temperature at the location). This step is performed by the distance module 312. Thus, Step 508 results in a determined location—also referred to as a distance between the roaming device and the BLE unit. In Step 510, the result of Step 508 is stored in a lookup table in association with the BLE unit's identifier; thereby relaying BLE information corresponding to a device strength to distance association. Step 510, in some embodiments, may also store the GPS location of the BLE unit (and/or roaming device) and time/date of the result in association with the BLE unit's identifier, as discussed above.

In Step 512, it is determined if other devices are present at the location, and if so, the roaming device repeats the above steps for all remaining BLE units in the area. Step 514. That is, such determinations and calculations are performed as the roaming device moves through the room and repeats Steps 502-508 for varying distances to all BLE units. Process 500 is based upon the understanding that the travel time of the trigger (the BLE signal communicated in Step 504) is comparably small. That is, the processing time from receiving the command in Step 504 to sending the audio command in Step 506 ultimately produces a distance error of less than 30 centimeters for the roaming device's location. Process 500 enables a determination of the roaming devices distance from a BLE unit up to at most a 30 centimeter area, thereby producing a precise determination of the user's location.

Turning to FIG. 6, a process 600 is shown illustrating steps performed in accordance with embodiments of the present disclosure where the devices have a microphone and BLE. In Step 602, the roaming device connects to a BLE unit using Bluetooth. This step is performed by the connection module 306. The roaming device triggers the BLE unit to start recording audio and process incoming audio for signals. Step 604. That is, the roaming device communicates a command to the connected BLE unit to record audio from surrounding devices within a threshold distance in order to detect incoming audio signals. Step 604, including the command provided by the roaming device and the detection event(s) occurring at the BLE unit, are performed by the signal module 308. Embodiments exist where the audio signals can be in the audible or inaudible spectrum. According to some embodiment, instead of the BLE unit recording signals in response to a command from a roaming device, the BLE unit may continuously, or periodically, record audio to detect incoming signals.

In Step 606, the roaming device sends an audio signal and logs its current audio stamp. That is, Step 606 involves the roaming device communicating an audio signal to the BLE unit, whereby the time of transmission of the signal is recorded. This is performed by the timestamp module 310, and the audio stamp is stored in the database 302. In Step 608, when the BLE unit detects the signal in the audio stream, the BLE unit immediately responds to the roaming device via Bluetooth. Detection of the signal in the audio stream can involve the BLE unit parsing the audio signal to identify the signal. In Step 610, the roaming device receives the response(s) via Bluetooth from the BLE unit, identifies a timestamp for the response(s), and logs the delay. That is, the time delay between the signal transmitted by the roaming device in Step 606 and the signal received from the BLE unit in Step 608 is determined. Step 612 involves translating this delay into a distance by multiplying the delay time by the speed of sound in the current conditions (e.g., temperature): c=(331.3+0.606*v) m/s, v=current temperature. Steps 610 and 612 are performed through a correlation of the timestamp module 310 for determination of the time delay, and the distance module 312 which implements the signal detection algorithm, as discussed above. The result of Step 612 embodies the distance between the roaming device and the BLE unit, which is stored in a lookup table or other data structure in database 302. Additionally, as with Processes 400 and 500, the distance is stored in association with an identifier of the BLE unit. Step 612, in some embodiments, may also store the GPS location of the BLE unit (and/or roaming device) and time/date of the result in association with the BLE unit's identifier, as discussed above. In Step 614, a determination is made regarding whether other BLE units are present at that location, and if so, Step 616 involves repeating Steps 602-614 for the other remaining BLE units.

Process 600 is based upon the understanding that time travel of the roaming device command and signal from Step 602-606, and response of the BLE unit (the BLE signal of Step 608) is small where time of travel for Bluetooth signals equals 300 million m/s. Process 600 enables a determination of the roaming devices distance from a BLE unit up to at most a 50 centimeter area, thereby producing a precise determination of the user's location.

Turning to FIG. 7, a process 700 is shown illustrating steps performed in accordance with embodiments of the present disclosure where the devices have only BLE capabilities. Process 700 involves at least one of the determined BLE information data sets stored in the lookup table from Processes 400-600. That is, as in Step 702, a lookup table is constructed based on results from at least one of the results from Process 400-600. The lookup table contains the following fields: BLE device identifier, signal strength and measured distance. In some embodiments, as discussed above, the lookup table may also contain the GPS location of each BLE unit/device (and/or roaming device for which results were determined) and time/date of the results (from at least one of Processes 400-600), which are associated with the BLE device identifier, as discussed above. In Step 704, a roaming device connects to the BLE unit and obtains the BLE identifier and signal strength of the BLE unit (referred to as an observed signal strength). This information is obtained by the roaming device connecting to the BLE unit and determining the signal strength associated with the BLE unit (as in Steps 402-404 of Process 400 discussed above). In Step 706, the roaming device sends a search query to a server.

According to some embodiments, the server is associated with the location and is correlated with the database 302 storing the lookup table. The query comprises the BLE identifier and the observed signal strength. In response to the query, the server searches the lookup table for the stored signal strength based on the BLE identifier. Step 708. In Step 710, the server returns the stored distance based on the query. In some embodiments, if the lookup table contains no entry of a stored signal strength associated with the observed signal strength for the BLE identifier, the server identifies the next smaller and the next larger signal strengths to the observed signal strength associated with the specific BLE identifier. Step 712. The server then calculates the distance by linearly interpolating these two records. Step 714. Steps 710-714 are performed by the distance module 312. The results of Step 710 or Step 714 are then communicated back to the roaming device.

The accuracy of Process 700 depends on the accuracy of data collected from Processes 400-600. That is, with increasing amounts of data collected from Processes 400-600, the distance accuracy of Process 700 improves. Process 700, which compounds Processes 400-600, produces a substantially higher accuracy tracking system than existing implementations. For example, existing system iBeacon™ produces an error of 1-2 m within 5 m, and an error of at least 3 m at distances greater 5 m; whereas, as discussed above, the disclosed systems and methods produce error distances to precise distances at or below 30-50 centimeters. Processes 400-700 are transferable to other devices rather than just solely attributable to a sole roaming device. Therefore, once a BLE unit has been calibrated (i.e., a distance per signal strength determination), another mobile device may reuse the lookup table (or other data structure) derived from the calibration procedure, as illustrated in Process 700, for example. Thus, the disclosed calibration techniques improve estimating distances and position tracking based on BLE technology regardless a specific device or vendor, or product design or material.

Figure 8:
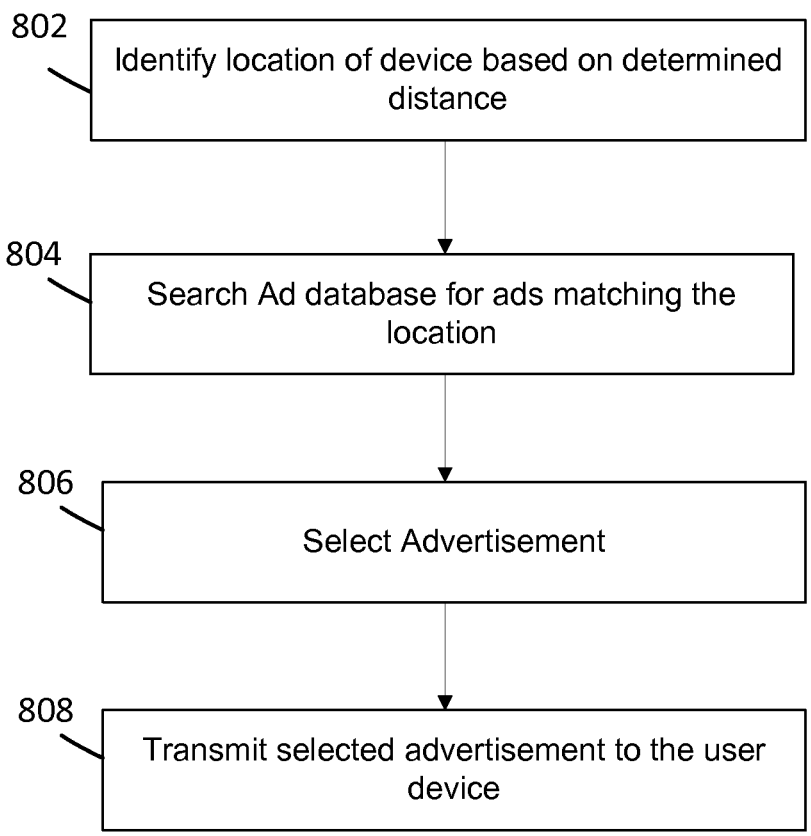
FIG. 8 is a flowchart illustrating steps performed in accordance with some embodiments of the present disclosure.

FIG. 8 is a work flow 800 of serving relevant advertisements based on a calibrated and determined distance from FIGS. 4-7. Specifically, FIG. 8 illustrates example embodiments of how advertisements are served to users of roaming devices based on the calibrated distances to particular BLE devices at or around a location. In Step 802, the determined distance and/or location (referred to as location information) of a user's device is identified. This identification is derived from the distance/BLE information of the user's roaming device from processes 400-700. In Step 804, the location information is communicated (or shared) to an advertisement server. Upon receipt of the location information, the advertisement server 130 performs a search for a relevant advertisement within an associated advertisement database. The search for an advertisement is based at least on the location information.

In Step 804, the advertisement server searches the advertisement database for advertisements that match the identified location. In Step 806, an advertisement is selected (or retrieved) based on the results of Step 804. In some embodiments, the advertisement can be selected based upon the result of Step 804, and modified to conform to attributes of the device upon which the advertisement will be displayed. For example, the ad database contains advertisements for 3 restaurants in a stadium. Based the determined location information of the user, the user is identified to be at or near restaurant X. This determination of the user being near the restaurant can be based upon a threshold, as discussed above, or based upon the user being closer to the BLE unit associated with restaurant X rather than the other restaurants. Therefore, via steps 802-806, an advertisement for restaurant X is identified and selected. In Step 808, the selected advertisement is shared or communicated to the user's device. In some embodiments, the selected advertisement is sent directly to each user's roaming device through applicable communication protocol and/or communication application.

Figure 9:
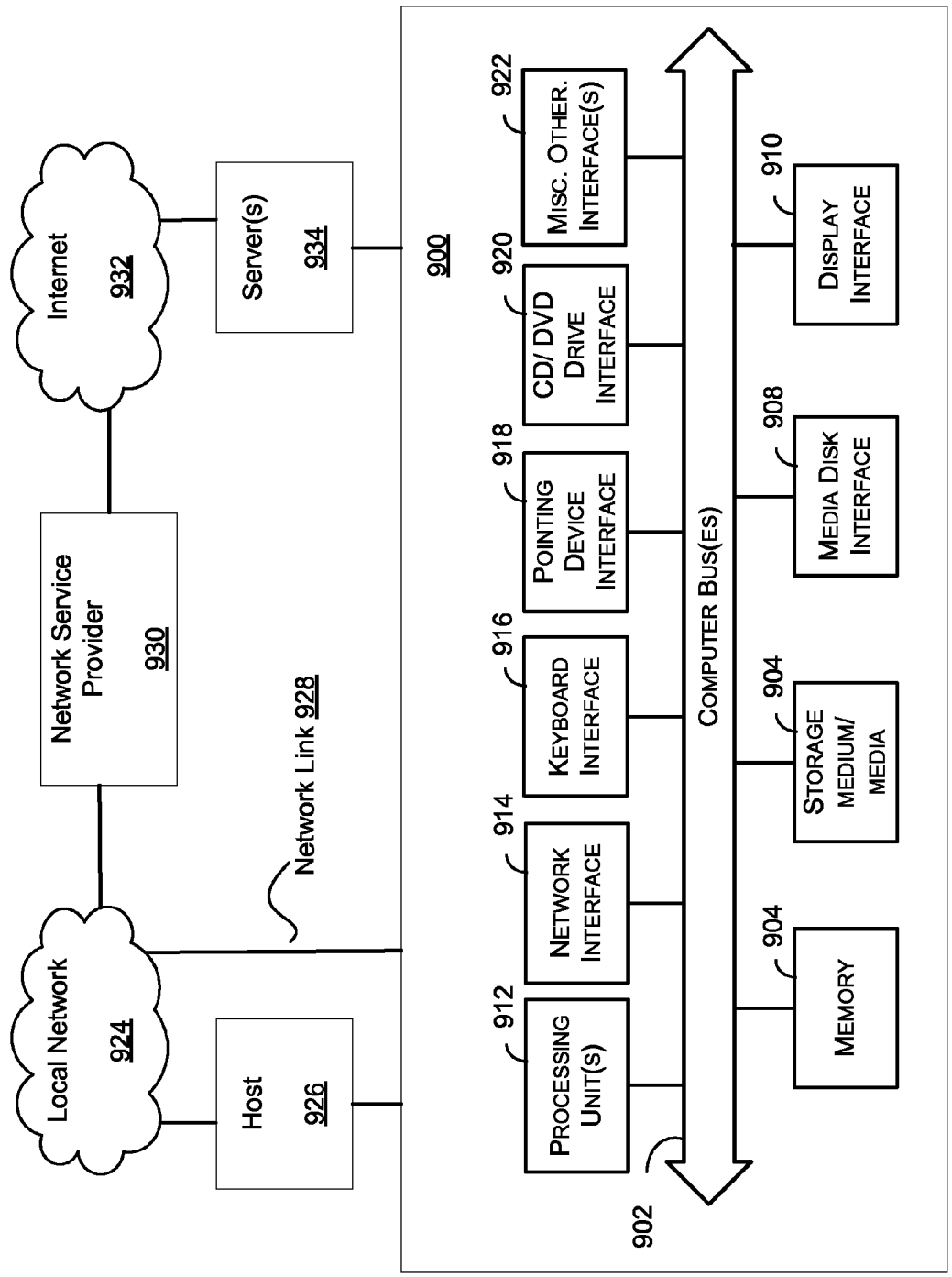
FIG. 9 is a block diagram illustrating architecture of a hardware device in accordance with one or more embodiments of the present disclosure.

As shown in FIG. 9, internal architecture 900 includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), media disk drive interface 920 as an interface for a drive that can read and/or write to media including removable media such as floppy, CD-ROM, DVD, media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing video data for presentation at display 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 902 as it is received, or may be stored in memory 904 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
    connecting, via a computing device, to a first Bluetooth Low Energy (BLE) unit at a location, said connection comprising identifying a beacon emitted from said first BLE unit and an identifier of the first BLE unit;
    determining, via the computing device, a signal strength associated with the first BLE unit from said beacon;
    emitting, via the computing device, a first signal, said first signal having a first timestamp associated with said emission and a second timestamp associated with reception by said first BLE unit;
    receiving, at the computing device, second signal emitted from the first BLE unit, said second signal having a third timestamp associated with the emission from the first BLE unit and a fourth timestamp associated with said reception of the second signal;
    determining, via the computing device, a distance between the computing device and the first BLE unit, said distance based upon an aggregated distance based on the first, second, third and fourth timestamps; and
    storing, via the computing device, said distance in a storage, said distance stored in association with said signal strength and the identifier of the first BLE unit.

2. The method of claim 1, wherein said distance determination further comprises:
    calculating the aggregated distance by determining a first time delay between the first timestamp and the second timestamp and a second time delay between the third timestamp and fourth timestamp, said aggregated distance equaling an aggregation of the first and second time delay;
    multiplying the aggregated distance by the speed of sound in a current condition at said location; and
    dividing the multiplied distance by 2, wherein a result of said division equals said distance.

3. The method of claim 2, wherein said speed of sound equals:
    (331.3+0.606*v) m/s, wherein v is said current condition representing a current temperature at said location.

4. The method of claim 1, further comprising:
    determining whether other BLE units are present at said location; and
    when other BLE units are present, repeating said steps for all other BLE units.

5. The method of claim 1, wherein said second timestamp and said third timestamp are recorded by the first BLE unit, wherein said computing device receives said second timestamp and said third timestamp in a communication from the first BLE unit.

6. The method of claim 1, wherein said aggregated distance represents a first distance from a speaker of the computing device to a microphone of the first BLE unit, and a second distance from a speaker of the first BLE unit to a microphone of the computing device.

7. The method of claim 1, wherein said computing device is a mobile device.

8. The method of claim 1, further comprising:
    determining a position of said computing device based on said distance;
    searching an advertisement database for an advertisement based on said position, said advertisement associated with an entity at said location, said entity associated with the first BLE unit; and
    selecting said advertisement, wherein said advertisement is to be displayed on a display of said computing device.

9. A non-transitory computer-readable storage medium tangibly encoded with computer-executable instructions, that when executed by a processor associated with a computing device, performs a method comprising:
    connecting to a first Bluetooth Low Energy (BLE) unit at a location, said connection comprising identifying a beacon emitted from said first BLE unit and an identifier of the first BLE unit;
    determining a signal strength associated with the first BLE unit from said beacon;
    emitting a first signal, said first signal having a first timestamp associated with said emission and a second timestamp associated with reception by said first BLE unit;
    receiving second signal emitted from the first BLE unit, said second signal having a third timestamp associated with the emission from the first BLE unit and a fourth timestamp associated with said reception of the second signal;
    determining a distance between the computing device and the first BLE unit, said distance based upon an aggregated distance based on the first, second, third and fourth timestamps; and storing said distance in a storage, said distance stored in association with said signal strength and the identifier of the first BLE unit.

10. The non-transitory computer-readable storage medium of claim 9, wherein said distance determination further comprises:
   calculating the aggregated distance by determining a first time delay between the first timestamp and the second timestamp and a second time delay between the third timestamp and fourth timestamp, said aggregated distance equaling an aggregation of first and second time delay;
   multiplying the aggregated distance by the speed of sound in a current condition at said location; and
   dividing the multiplied distance by 2, wherein a result of said division equals said distance.

11. A system comprising:
   a computing device comprising:
   memory storing computer-executable instructions; and
   one or more processors for executing said computer-executable instructions for:
      connecting to a first Bluetooth Low Energy (BLE) unit at a location, said connection comprising identifying a beacon emitted from said first BLE unit and an identifier of the first BLE unit;
      determining a signal strength associated with the first BLE unit from said beacon;
      emitting a first signal, said first signal having a first timestamp associated with said emission and a second timestamp associated with reception by said first BLE unit;
      receiving second signal emitted from the first BLE unit, said second signal having a third timestamp associated with the emission from the first BLE unit and a fourth timestamp associated with said reception of the second signal;
      determining a distance between the computing device and the first BLE unit, said distance based upon an aggregated distance based on the first, second, third and fourth timestamps; and
      storing said distance in a storage, said distance stored in association with said signal strength and the identifier of the first BLE unit.

* * * * *